Sept. 7, 1948.  W. J. CHAMPION  2,448,659
DEVICE FOR WINDING HECTOGRAPH ROLLS EVENLY
Filed April 26, 1944
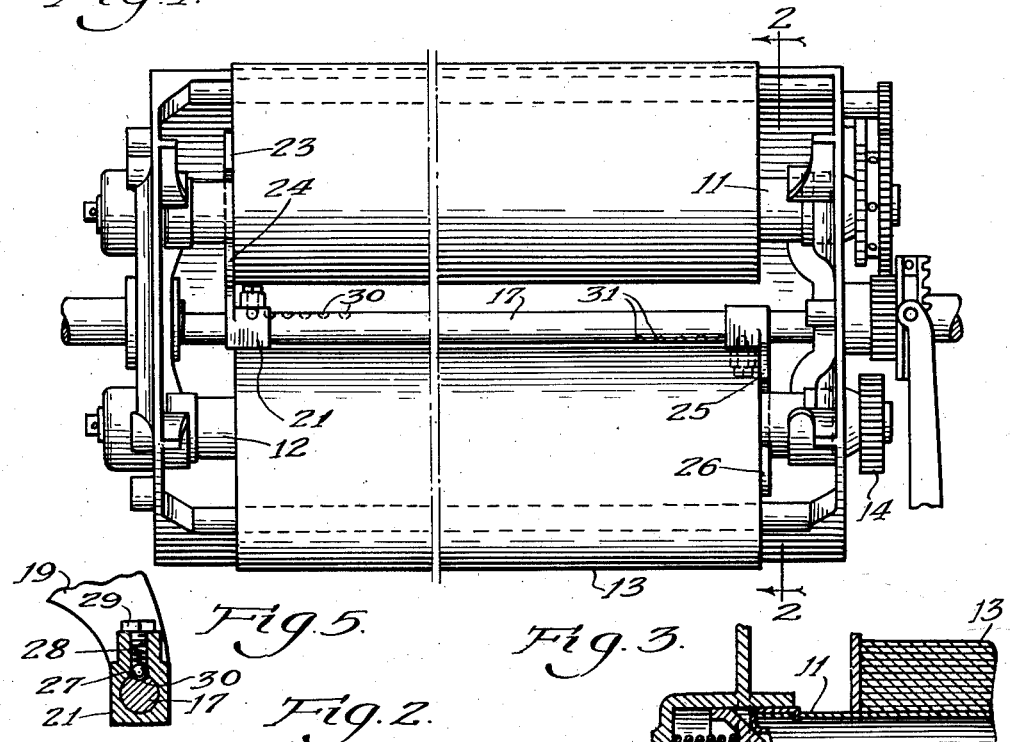
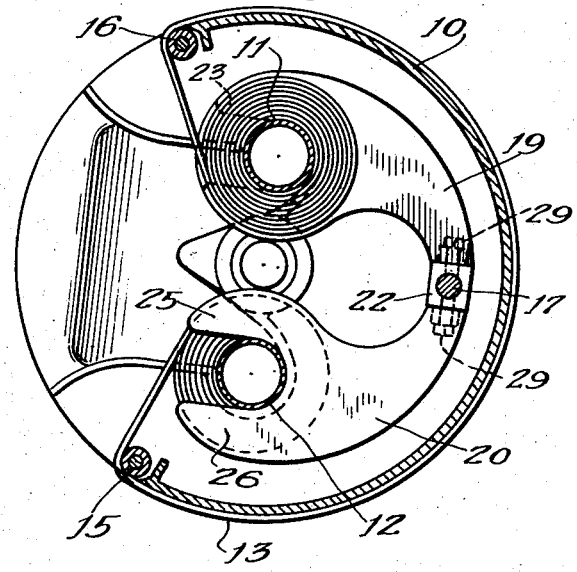
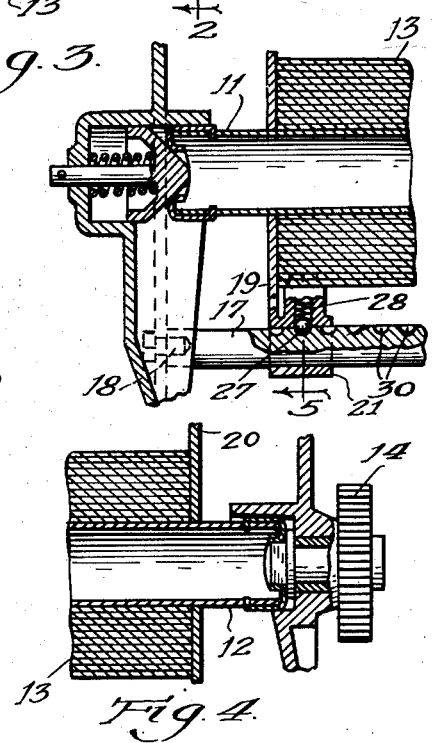
Inventor:
William J. Champion
By Zahl, Carlson, Fritzbaugh & Wells
Attorneys Patented Sept. 7, 1948

2,448,659

UNITED STATES PATENT OFFICE 2,448,659

DEVICE FOR WINDING HECTOGRAPH ROLLS EVENLY

William J. Champion, La Grange, Ill., assignor to Ditto, Incorporated, Chicago, Ill., a corporation of West Virginia Application April 26, 1944, Serial No. 532,862

8 Claims. (Cl. 101—132)

1

The present invention relates to duplicating apparatus and more particularly to means whereby to prevent the gelatin bands in a hectograph duplicating machine from winding spirally as they are transferred from the take off spindle across the platen to the take up spindle. In the application of Kenneth O. Hirleman, Serial No. 529,393, filed April 3, 1944, for "Winding device for hectograph rolls," now abandoned, there is shown a spindle attachment for this purpose. It is the purpose of this invention to provide an improved means that may be a part of the machine itself rather than the spindle for preventing the spiralling of the gelatin band.

In duplicating machines wherein the copy to be duplicated is transferred to a gelatin mass on a band and the band itself is wound upon one spindle and extended across the platen of the machine to another spindle so that the used portions of the band can be wound upon the take up spindle and fresh portions of the band can be drawn upon the platen, the band has a tendency as it is transferred from one spindle to the other to wind unevenly. The tendency of the band to spiral or wind unevenly increases with use of the band and oftentimes results in the side edge of the band moving to the edge of the platen and becoming damaged. Furthermore, this tendency to wind spirally sometimes causes the band to bind on the platen and this makes it very difficult to draw the band across the platen and tighten it up evenly thereon.

According to my invention I provide means in connection with the spindle mounting at the opposite ends of the platen whereby spiralling of the bands as they are transferred from one spindle to the other can be prevented. My invention is particularly applicable to the drum type of duplicating apparatus although it is also applicable to the flat bed type. More particularly it is the purpose of my invention to provide in a duplicating machine of this character having a drum type platen means inside the drum positioned to engage the side edges of a duplicating band extending from one spindle within the drum around the platen to another spindle within the drum, the means being so arranged that it engages the edge of the gelatin band remote from the drive point of the take up spindle and the opposite end of the gelatin band on the take off spindle.

The features and advantages of the invention will appear more fully from the following description, reference being had to the accompanying drawings wherein a preferred form of the invention is shown. It is to be understood however that the drawings and description are illustrative only and are not to be taken as limiting the invention except insofar as it is limited by the claims.

In the drawings:

Fig. 1 is a view in side elevation of a drum of a duplicating machine having take up and take off spindles mounted therein with a gelatin band extending around the drum from one spindle to the other;

Fig. 2 is a sectional view taken on the line 2—2 of Fig. 1;

Fig. 3 is a fragmentary sectional view through the take up spindle showing the mounting of one end of the spindle and showing how my device is applied to the side edge of the gelatin band;

Fig. 4 is an enlarged fragmentary sectional view taken through the opposite end of the take off spindle and showing the mounting thereof, and Fig. 5 is a fragmentary sectional view on the line 5—5 of Fig. 3.

Referring now in detail to the drawings, the present invention is shown as embodied in a machine of the type shown in the Hernlund Patent No. 2,034,903, dated March 24, 1936. In this machine the platen comprises a drum 10 having mounting means therein for a take up spindle 11 and a take off spindle 12. The spindles and their particular mounting means, as shown herein, are essentially the same as are shown in the Marchev Patent No. 2,066,637, dated January 5, 1937. In the apparatus shown the spindle 11 is the driven spindle, power being applied to this spindle in order to draw a gelatin band 13 across the platen surface of the drum 10 from the spindle 12. The spindle 12 has one end thereof connected to a ratchet wheel 14 with which a pawl (not shown) may be engaged to stop rotation of the spindle when desired.

The gelatin band 13 passes from the spindle 12 outwardly around a roller 15, then around the platen surface of the drum and over a roller 16 to the spindle 12. Power is applied to the spindle 11 so that the gelatin band is drawn across the surface of the drum and tightened thereon. When a particular portion of the gelatin band has been used and a fresh portion is desired the pawl for the ratchet wheel 14 is released and the spindle 11 is rotated until the used part of the band is wound on the spindle 11 and a fresh portion of the band is extended around the drum. In the Hirleman application hereinbefore described the difficulty preventing spiralling of the gelatin band in its winding from one spindle to the other is taken care of by providing disks on the spindles themselves. However, the spindles may be changed and when a band becomes unserviceable the spindles may be salvaged and returned and the disks are always subject to damage or they may become lost in the handling of a spindle, whether full or empty, when it is out of the machine. According to my invention I obtain the same correction of the spiralling of the band as is obtained by Hirleman but I do so by providing means in the machine itself to take care of the difficulty.

I provide a bar 17 which extends from end to end of the drum and which is secured in position by means of screw bolts, one of which is indicated at 18 in Fig. 3 of the drawings. The bar 17 as shown is circular in cross section. It serves as a mounting means for two plates 19 and 20. The plate 19 has a hub portion 21 encircling the bar while the plate 20 has a hub portion 22 encircling the bar. The plates extend forwardly and are enlarged and bifurcated at their free ends so as to fit snugly about the spindles 11 and 12. The bifurcated tips of the plate 19 are indicated at 23 and 24 in Fig. 1 of the drawings. The bifurcated tips of the plate 20 are identified by the numerals 25 and 26. It is desirable to have the plates which are relatively thick and stiff arranged so as to be adjustable lengthwise of the bar 17 as well as circumferentially of the bar. This is accomplished by providing in each of the hubs 21 and 22 a spring pressed ball 27 which is backed up by a spring 28 (see Fig. 3), the spring being in turn held in place by a screw bolt 29 (see Fig. 5). The bar itself is provided with a series of recesses 30 adjacent one end and another series of recesses 31 adjacent the other end. The recesses are exaggerated in the drawings since they are made shallow in order that the ball 27 can be forced out of the recesses in adjusting the plates 19 and 20.

In placing the spindles in the drum ends it will be noted that the spindles must travel along a curved path in order to seat against the holding members that are mounted in the ends of the drum, guides being provided on the drum ends to direct the spindles in this fashion. The bifurcated ends of the plates 19 and 20 do not align with the entrance path of the spindle and therefore it is necessary that the hubs of these plates be capable of rotation on the bar 17 so that as a spindle is moved into place the plate can adjust itself circumferentially of the bar 17 to follow the spindle after it enters between the bifurcations 23 and 24 or the bifurcations 25 and 26. Once the spindle is in place the ball 27 is lined up with a row of depressions 30 or 31 and the plate can then be moved into position to engage the side edge of the gelatin band on the spindle.

The mechanism hereinbefore described provides a very simple attachment for a duplicating machine. I find that to fully avoid the tendency of the band toward spiral winding the plate that receives the power driven spindle 11 must be located at the side edge of the gelatin band most remote from the point of the power application, and the other plate 20 must be located at the opposite edge of the gelatin band. The plates may take various shapes but they should in all cases engage the side edges of the band at the point where the band meets the roll. The plates being adjustable on the bar 17 can be adapted to any particular width of gelatin band without difficulty since the recesses 30 are arranged to make the necessary adjustment for the various standard widths of gelatin bands. Since the plates are permanently mounted in the drum there is no difficulty involved in connection with the spindles; that is, they cannot be put in wrong and they carry no disk projections or other extra attachments that might be damaged in the handling of the empty spindles.

From the foregoing description it is believed that the nature and advantages of the present invention will be readily apparent to those skilled in this art.

Having thus described my invention, what I claim as new and desire to secure by Letters Patent is:

1. In a duplicating machine having a platen, a gelatin band extending across the face of said platen, a spindle adjacent one end of the platen on which one end of the gelatin band is mounted, a second spindle adjacent the other end of the platen on which the other end of the band is mounted, said spindles being mounted for rotation so that the band may be drawn across the platen and wound on one spindle as it is unwound from the other, means to prevent spiraling of the band on the spindles, comprising a bifurcated plate mounted in a plane substantially perpendicular to the axis of one spindle adjacent one end thereof in position to engage the edge of the band wound thereon, a second bifurcated plate mounted in a plane substantially perpendicular to the axis of the other spindle adjacent the other end thereof in position to engage the other side edge of said band, the spindles being received between the bifurcations of said plates.

2. In a duplicating machine having a platen, a gelatin band extending across the face of said platen, a spindle adjacent one end of the platen on which one end of the gelatin band is mounted, a second spindle adjacent the other end of the platen on which the other end of the band is mounted, said spindles being mounted for rotation so that the band may be drawn across the platen and wound on one spindle as it is unwound from the other, means to prevent spiraling of the band on the spindles comprising a bifurcated plate mounted in a plane substantially perpendicular to the axis of one spindle adjacent one end thereof in position to engage the edge of the band wound thereon, a second bifurcated plate mounted in a plane substantially perpendicular to the axis of the other spindle adjacent the other end thereof in position to engage the other side edge of said band, the spindles being received between the bifurcations of said plates, said plates being adjustable lengthwise of the spindles and movable in their planes.

3. In a duplicating machine, a platen drum, a take up spindle, a take off spindle, means in said drum removably mounting the take up spindle and the take off spindle, a gelatin band on said spindles and extending around the face of said drum, a member mounted in said drum adjacent one end thereof and including a projecting plate portion adapted to fit partially around the take up spindle, and another member mounted in the drum adjacent the other end thereof and including a projecting plate portion adapted to fit partially around the take off spindle, whereby one of said plate portions guides one side edge of the gelatin band and the other plate portion guides the other side edge of the band.

4. In a duplicating machine, a platen drum, a take up spindle, a take off spindle, means in said drum removably mounting the take up spindle and the take off spindle, a gelatin band on said spindles and extending around the face of said drum, a member mounted in said drum adjacent one end thereof and including a projecting plate portion adapted to fit partially around the take up spindle, another member mounted in the drum adjacent the other end thereof and including a projecting plate portion adapted to fit partially around the take off spindle, whereby one of said plate portions guides one side edge of the gelatin band and the other plate portion guides the other side edge of the band, and a bar secured in the drum on which both said members are mounted.

5. In a duplicating machine, a platen drum, a take up spindle, a take off spindle, means in said drum removably mounting the take up spindle and the take off spindle, a gelatin band on said spindles and extending around said drum, a member mounted in said drum adjacent one end thereof and including a bifurcated plate portion adapted to fit over the take up spindle, another member mounted in the drum adjacent the other end thereof and including a bifurcated plate portion adapted to fit over the take off spindle, whereby one of said plate portions guides one side edge of the gelatin band and the other plate portion guides the other side edge of the band, and a bar secured in the drum on which both said members are mounted for movement lengthwise and about said bar, said members having spring pressed members engaging the bar to yieldingly oppose movement of the members on the bar.

6. In a duplicating machine, a platen drum, a take up spindle, a take off spindle, means in said drum removably mounting the take up spindle and the take off spindle, a gelatin band on said spindles and extending around said rum, a member mounted in said drum adjacent one end thereof and including a projecting plate portion adapted to fit partially around the take up spindle, and another member mounted in the drum adjacent the other end thereof and including a projecting plate portion adapted to fit partially around the take off spindle, whereby one of said plate portions guides one side edge of the gelatin band and the other plate portion guides the other side edge of the band, said drum having drive means engaging the end of the take up spindle most remote from the bifurcated plate portion that fits partially around the take up spindle.

7. In a duplicating machine, a drum serving as a platen, a take up spindle therein, drive means at one end of the drum having driving engagement with the spindle, a take off spindle in the drum, a gelatin band extending from the inner side of the take off spindle around the face of the drum to the inner side of the take up spindle, plate means mounted inside the drum in position to engage the edge of the band as it is wound on the take up spindle along the edge of the band most remote from the drive means, and a plate means mounted inside the drum in position to engage the other edge of the band at the point where it leaves the take off spindle.

8. In a duplicating machine, a drum serving as a platen, a take up spindle therein, drive means at one end of the drum having driving engagement with the spindle, a take off spindle in the drum, a gelatin band extending from the inner side of the take off spindle around the face of the drum to the inner side of the take up spindle, plate means mounted inside the drum in position to engage the edge of the band as it is wound on the take up spindle along the edge of the band most remote from the drive means, and a plate means mounted inside the drum in position to engage the other edge of the band at the point where it leaves the take off spindle, a bar in the drum on which both said plate means are mounted to extend oppositely therefrom, and cooperating parts on the bar and the plate means providing adjustment of said plate means axially of the drum.

WILLIAM J. CHAMPION.

REFERENCES CITED

The following references are of record in the file of this patent:

UNITED STATES PATENTS

| Number | Name | Date |
|---|---|---|
| 534,284 | Schriver | Feb. 19, 1895 |
| 553,045 | Sullivan | Jan. 14, 1896 |
| 584,787 | Lowe | June 22, 1897 |
| 1,348,242 | Ross | Aug. 3, 1920 |
| 1,387,764 | Chipperfield | Aug. 16, 1921 |
| 1,491,509 | Beals | Apr. 22, 1924 |
| 1,538,399 | Green | May 19, 1925 |
| 1,949,154 | Fecher | Feb. 27, 1934 |
| 2,137,096 | Ritzerfeld | Nov. 15, 1938 |
| 2,220,265 | Morrison | Nov. 5, 1940 |

FOREIGN PATENTS

| Number | Country | Date |
|---|---|---|
| 205,515 | Great Britain | Dec. 27, 1923 |

Certificate of Correction

Patent No. 2,448,659.

September 7, 1948.

WILLIAM J. CHAMPION

It is hereby certified that errors appear in the printed specification of the above numbered patent requiring correction as follows: Column 5, line 32, claim 5, after the word "lengthwise" insert *of*; line 40, claim 6, for "rum" read *drum*; and that the said Letters Patent should be read with these corrections therein that the same may conform to the record of the case in the Patent Office.

Signed and sealed this 23rd day of November, A. D. 1948.

[SEAL]

THOMAS F. MURPHY,
*Assistant Commissioner of Patents.*